(12) United States Patent
Probst et al.

(10) Patent No.: US 10,890,461 B2
(45) Date of Patent: Jan. 12, 2021

(54) MAP ENRICHED BY DATA OTHER THAN METADATA

(71) Applicant: International Business Machines Corporation, Armonk, NY (US)

(72) Inventors: Katharina Probst, St. Leon Rot (DE); Manuel Mayr, Walldorf (DE); Olaf Rutz, Sandhausen (DE); Oliver Petrik, Stuttgart (DE); Maurice Debatin, Mannheim (DE); Jochen Röhrig, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/966,180

(22) Filed: Apr. 30, 2018

(65) Prior Publication Data
US 2019/0331505 A1  Oct. 31, 2019

(51) Int. Cl.
*G01C 21/36* (2006.01)
*G06F 16/29* (2019.01)

(52) U.S. Cl.
CPC ......... *G01C 21/3691* (2013.01); *G06F 16/29* (2019.01)

(58) Field of Classification Search
CPC .............. G01C 21/3691; G01C 21/32; G06F 17/30241; G06F 17/24522; G06F 16/24575; G06F 16/9535; G06F 16/2425; G06F 16/2445; G06F 21/31; G06F 21/6218; G06F 16/29
See application file for complete search history.

(56) References Cited

U.S. PATENT DOCUMENTS

| | | | |
|---|---|---|---|
| 8,212,784 B2 | 7/2012 | Popp | |
| 8,533,180 B2 | 9/2013 | Pschierer et al. | |
| 2005/0034062 A1* | 2/2005 | Bufkin | G06F 40/169 |
| | | | 715/230 |
| 2009/0059874 A1 | 3/2009 | Carter | |
| 2010/0289642 A1 | 11/2010 | Harrison | |
| 2012/0197713 A1* | 8/2012 | Stroila | G01C 21/3614 |
| | | | 705/14.49 |
| 2014/0105395 A1 | 4/2014 | Hart et al. | |
| 2015/0149910 A1 | 5/2015 | Higgins et al. | |
| 2015/0339352 A1 | 11/2015 | Bice et al. | |
| 2017/0358204 A1* | 12/2017 | Modica | G08G 1/0112 |
| 2018/0202814 A1* | 7/2018 | Kudrynski | G06T 7/55 |
| 2019/0226853 A1* | 7/2019 | Kubiak | G01S 19/46 |
| 2019/0325236 A1* | 10/2019 | Zaba | G06K 9/627 |
| 2019/0325736 A1* | 10/2019 | Zhang | G06K 9/00818 |

OTHER PUBLICATIONS

Dueker, K., "Geographic Information Systems and Computer-Aided Mapping," Journal of the American Planning Association, 1987, Published online: Nov. 26, 2007, vol. 53, Issue 3, pp. 1-5. (Abstract only) http://dx.doi.org/10.1080/01944368708976457.
"Real Property Geographic Information Systems (GIS) Program," Office of Tax and Revenue, Printed: Sep. 23, 2017, pp. 1-2. https://otr.cfo.dc.gov/page/real-property-geographic-information-systems-gis-program.

* cited by examiner

*Primary Examiner* — Mussa A Shaawat
(74) *Attorney, Agent, or Firm* — Kelsey M. Skodje

(57) ABSTRACT

A method for enriching map functions of a digital geographical map is provided. Additional data are stored in a storage unit outside map data of the digital geographical map and direct related map metadata. Elements of the additional data are correlated to coordinates of the digital geographical map. Further, access is provided to the additional data via an authentication service while navigating the geographical map.

19 Claims, 5 Drawing Sheets

MAP ENRICHED BY DATA OTHER THAN METADATA

The disclosure relates generally to enriching map functions of a digital geographical map, and more specifically, to combining map data with additional data not being metadata of the map. The disclosure relates further to a related system for enriching map functions of a digital geographical map and a computer program product.

BACKGROUND

Using navigation maps has become a standard procedure for driving cars or steering boats. These navigation systems using the digital geographical navigation maps are almost all GPS (global positioning system)-based, and are in many cases usable without any additional costs. These maps may also be used to calculate an optimal path from a starting point to a destination. Furthermore, these maps/navigation systems may also comprise functionality like calculating alternative routes with and without special conditions—e.g., avoiding toll-routes, ferries, etc.—and avoiding traffic jams, showing gas stations, restaurants, museums and/or other points of interest. In some cases, website names and links, relating to one of these points of interest may be accessible by using the digital map. These data are part of the metadata of the digital geographical map, and are provided by the map service provider.

SUMMARY

According to one aspect of the present disclosure, a method for enriching map functions of a digital geographical map may be provided. The method may comprise storing additional data in a storage unit outside map data of the digital geographical map and direct related map metadata, correlating elements of the data to coordinates of the geographical map, and providing access to the additional data via an authentication service while navigating the digital geographical map.

According to another aspect of the present disclosure, a system for enriching map functions of a digital geographical map may be provided. The system may comprise a storage unit for storing additional data other than map data of the digital geographical map and map metadata, a correlation unit adapted for correlating elements of the data to coordinates of the geographical map, and an access unit adapted for providing access to the additional data via an authentication service while navigating the digital geographical map.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the disclosure are described with reference to different subject-matters. In particular, some embodiments are described with reference to method type claims, whereas other embodiments are described with reference to apparatus type claims. However, a person, skilled in the art, will gather from the above and the following description that, unless otherwise notified, in addition to any combination of features belonging to one type of subject matter, also any combination between features relating to different subject matter, in particular, between features of the method type claims, and features of the apparatus type claims, is considered as to be disclosed within this document.

The aspects defined above, as well as further aspects of the present disclosure, are apparent from the examples of embodiments to be described hereinafter, and are explained with reference to the examples of embodiments to which the disclosure is not limited.

Figure 1:
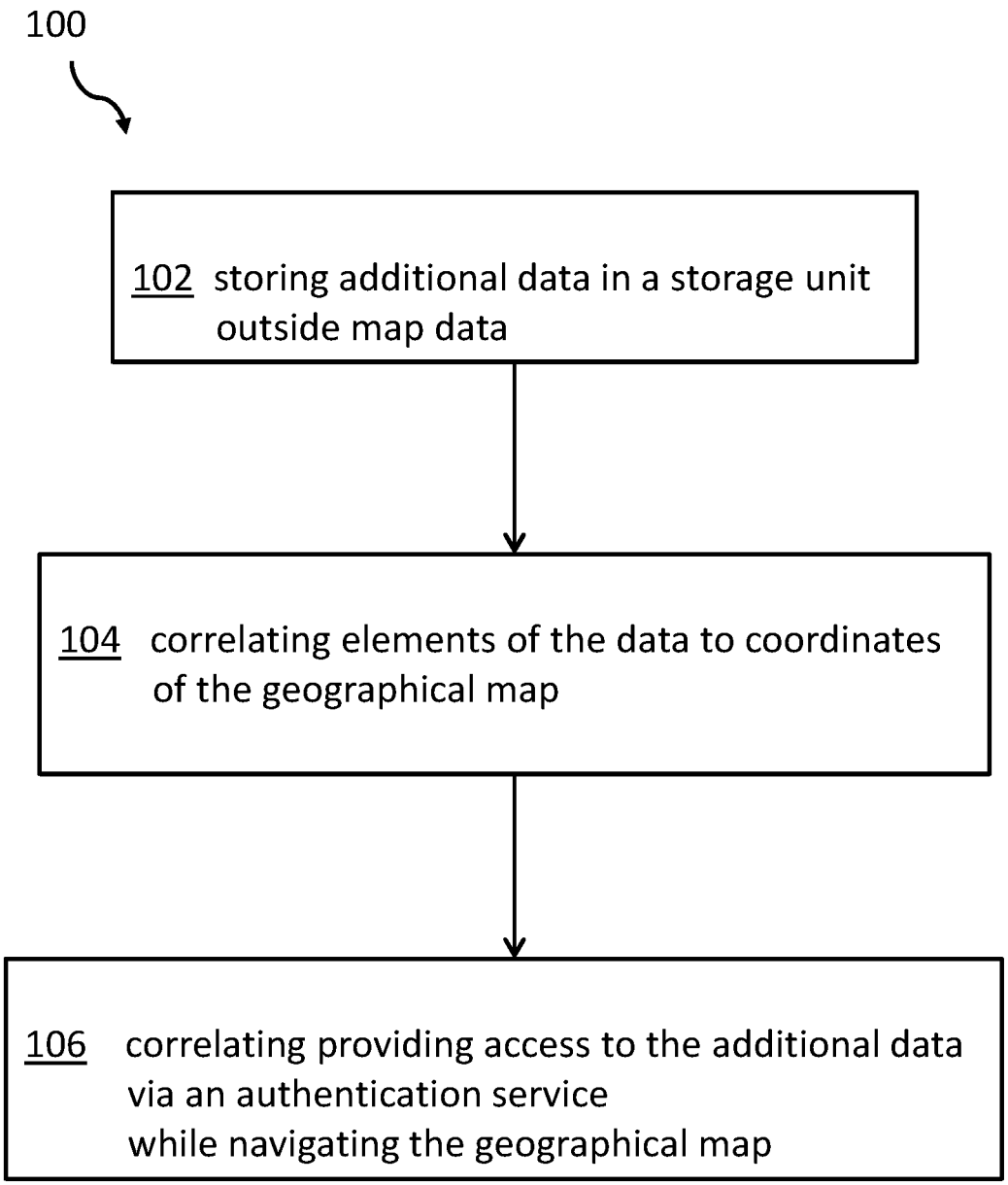

Preferred embodiments of the disclosure will be described by way of example only, and with reference to the following drawings:

FIG. 1 is a flow diagram illustrating an embodiment of the inventive method for enriching map functions of a digital geographical map.

Figure 2:
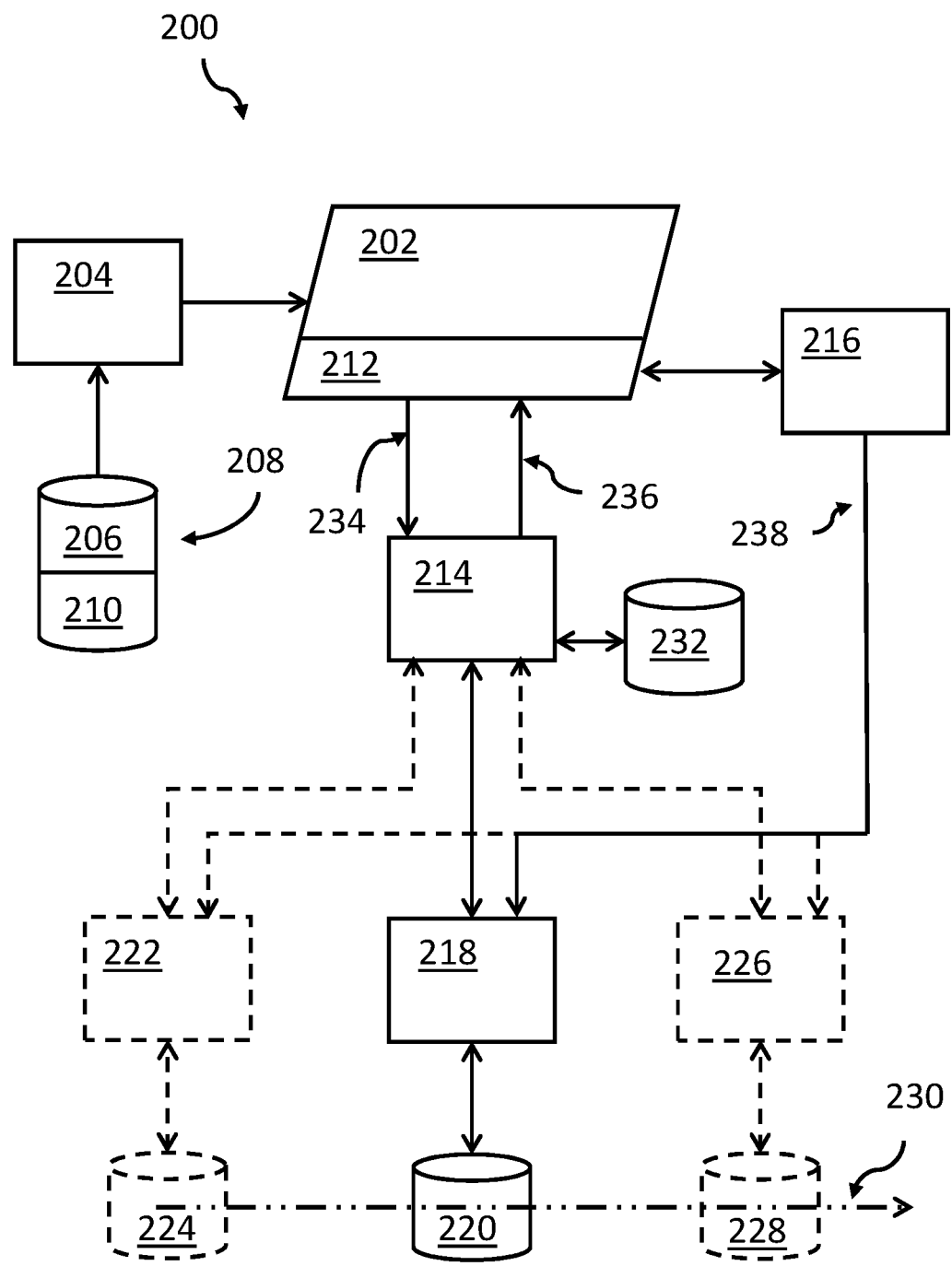

FIG. 2 is a block diagram illustrating an embodiment of functional and system components for implementing the proposed concept.

Figure 3:
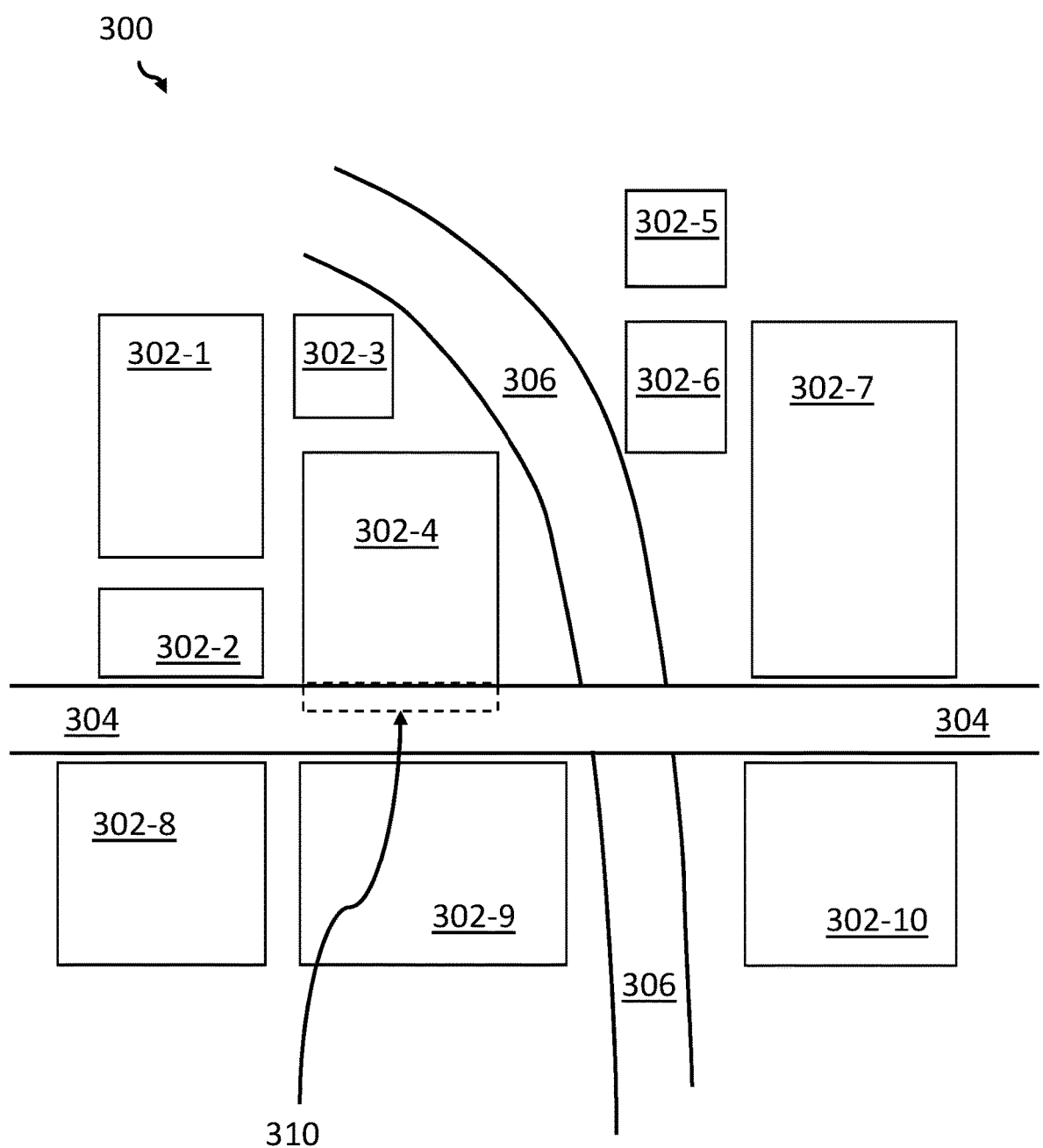

FIG. 3 is a block diagram illustrating an exemplary fraction of a digital geographical map.

Figure 4:
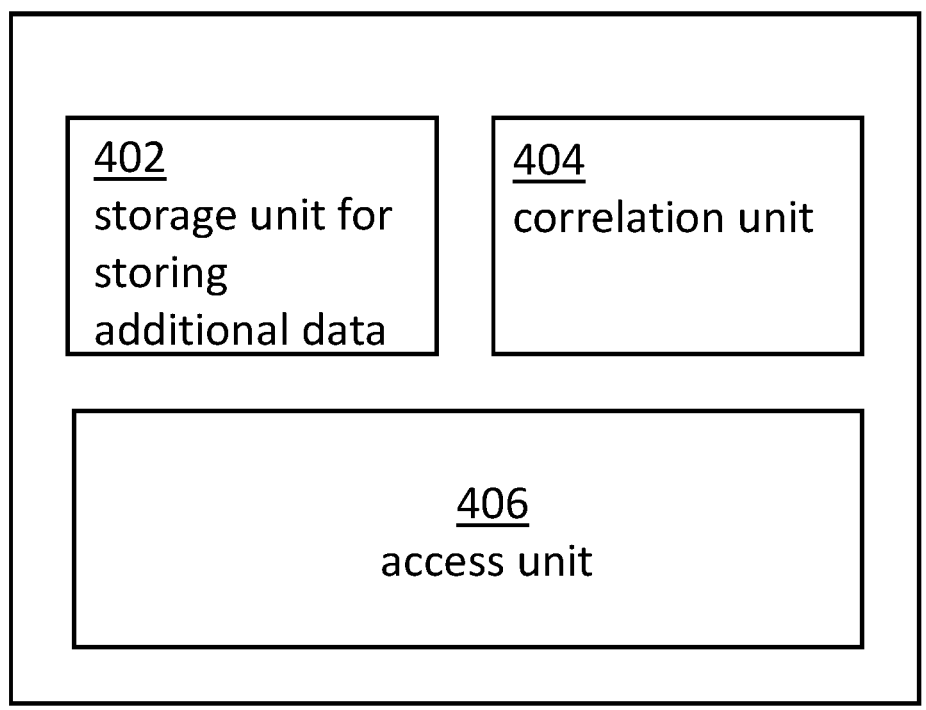

FIG. 4 is a block diagram illustrating an embodiment of the inventive system for enriching map functions of a digital geographical map.

Figure 5:
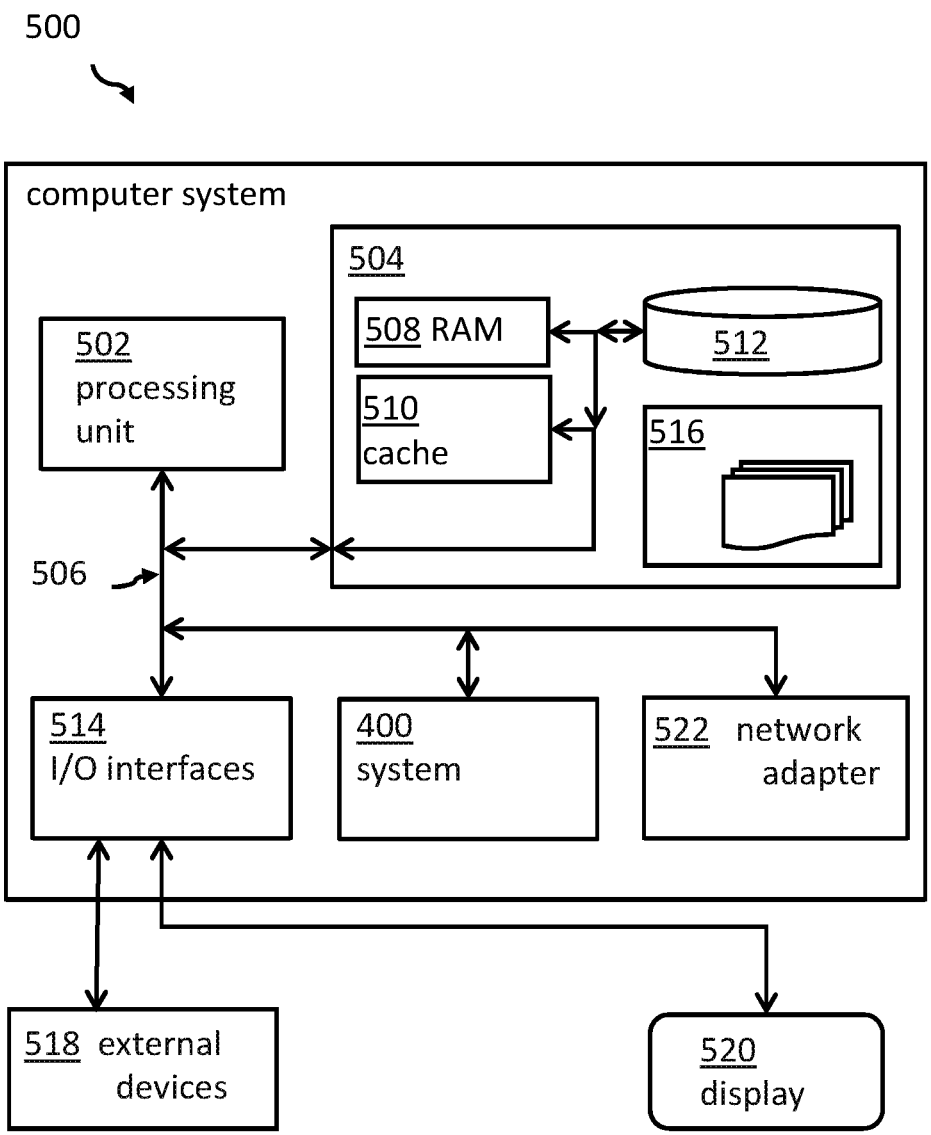

FIG. 5 is a block diagram illustrating an embodiment of a computing system comprising the system for enriching map functions according to FIG. 4.

DETAILED DESCRIPTION

In the context of this description, the following conventions, terms and/or expressions may be used:

The term 'enriching map function' may denote a process of enhancing a functionality of a digital geographical map displayed on a computer screen. Typically, today's map data may include some data not only showing the streets and geographical characteristics like rivers and lakes. Instead, the data may also include information about restaurants, hotels, points of interest, and/or gas stations. These data may be understood as metadata of the map. They may be stored together with the pure map data. The process of enrichment functions of the map may go beyond such displaying of metadata stored together with the map.

The enrichment function and/or additional data may be relevant only for a single user. It may involve personal, sensitive or confidential information which must not be shared with the provider of the map data and its related metadata. Thus, a combination of the map data and its related metadata and the additional data and/or functions may only become visible for a specific user in a specific area of the map. Another user may only see the bare map data, potentially with its metadata.

The term 'digital geographical map' may denote a result of the work of a cartographer, i.e., map-making. Road maps are perhaps the most widely used maps today. They form a subset of navigational maps, which also include aeronautical and nautical charts, railroad network maps, and hiking and bicycling maps. The main focus of the here proposed concept may be related to maps of cities and/or road maps. However, the concept may also work for nautical maps and aeronautical maps, or hiking maps.

The term 'additional data' may denote data not being part of the map data or the metadata relating to the map data.

Typically, the metadata of a map may also be visible to all users of a digital map. They may require that an additional fee may be paid, but in general they are accessible by all users because they are stored together with the map. In contrast to this, the additional data in the meaning of this document, are not stored together with the map data. They may be stored and security-wise treated completely independent from the map and map metadata. In particular, the provider of the map data as well as the metadata to the digital geographical map may never have access to the additional date or related functions, like workflows or transactions.

The term 'direct related map metadata may denote data stored together with the digital map. There may be a 1:1 relationship between the metadata and the digital maps, and vice versa.

The term 'navigating' may denote hovering with a pointer operated by a movement of a pointing device over the displayed digital geographical map. This way, the pointer may be moved or hovered over different details of the map, such as a street, an estate, a park, a lake, or the like.

The term 'confidential data, personal data, or sensitive data' may denote data with restricted access, i.e., not accessible by the public. Data, which may have a relation to specific geographical positions, may only be relevant or specific to a single user or group. This data should not be accessible to the digital geographic map provider or other non-authorized users. Further, this data should not be displayed with the public map data.

The proposed method for enriching map functions of a digital geographical map may offer multiple advantages and technical effects:

Foremost, the additional data or information of interest to selected users may not be shared with the service provider of the digital map or other unauthorized users. The additional data and the map data together with the related metadata of the map are stored and managed completely separate and independent from each other. Additionally, the data from the service provider managing the additional data may be transferred completely encrypted from the service provider system to a visualization function for the additional data overlaid with the digital geographical map. Thus, the additional data are never touched by the map service provider. This significantly enhances data security and privacy aspects of the additional data in relationship to a specific user.

Furthermore, it may not only be possible to display additional data in a digital map, but also to trigger workflows on the system of the service provider for the additional data or start transactions. As a further advantage, it may also be possible to coordinate the started workflow across service provider systems of different service providers. All of this may be completely transparent to the user. He may not have to log into additional systems by providing user credentials (e.g., user ID, password). He may only identify himself to a broker system, which manages the connections to additional server provider systems apart from the system of the map provider.

The link from the geographical coordinates to a service provider may be managed by a broker system being aware of a service provider for the additional data, based on automatically transmitted credentials as well as a range of geographical coordinates. The user may interact directly and seamlessly with the additional data shown as part of the map in his user interface, while the map data provider has no information whatsoever about these additionally displayed data, started transactions or workflows.

In the following, more embodiments of the method—also applicable to the related system—will be described:

According to one preferred embodiment of the method, the additional data may be confidential data, personal data, or sensitive data. Thus, they may be protected for an access by unauthorized people, systems, and/or service providers.

According to one additionally preferred embodiment of the method, the providing access to the additional data also may comprise triggering a transaction. Such a transaction may be processed on a provider system relating to the additional data. It may also be possible to start a workflow on the provider system hosting the additional data. Furthermore, the transaction or the workflow may be triggered spanning more than one service provider system, as well as, spanning provider systems from different providers. This way, the displayed map to the user showing also the additional data may function as integration point for coordinating the functionality of a service provider system or a plurality of systems. The provider of the geographical map is not involved at all, apart from providing the digital geographical map data (or navigation functions or providing map metadata).

According to one advantageous embodiment of the method, the additional data may be encrypted, in particular, stored and transmitted in encrypted form. An encryption may be performed by an enhanced browser—e.g., and enhanced browser component—for also displaying the map data. Thus, an end-to-end encryption of the additional data between the provider and the browser may be achieved.

According to a further preferred embodiment of the method, the providing access to the additional data may comprise selecting a provider for the additional data based on received map/geographical coordinate data and related user credentials. This way, a link between the geographical data and a provider of the additional data may be established, i.e., a correlation may exist. Also, an automatic login to the provider system with an automatic access to the additional data may be achieved.

According to one optional embodiment of the method, the providing access to the additional data may also comprise selecting a geographical area (e.g., selecting a rectangle by a user using a browser and a pointing device), sending coordinates framing the geographical area from the user operated browser (e.g., to a broker from a requestor site), and determining a relationship between the coordinates and a service provider having stored the additional data relating to the geographical area. For this, it may be useful if the broker may maintain a directory of geographical data, related user credentials, and service provider systems of the additional data.

Furthermore, the method may comprise receiving the additional data in encrypted form at the requestor site. That is, the service provider system may transmit the additional data via the broker to an enhanced browser component/function of the user system. Neither the broker system nor the map provider system may be able to decrypt or even "see" the data in clear text.

According to one permissive embodiment of the method, the additional data may be provided by a plurality of service provider systems. Thereby, the providing access to the additional data may also comprise triggering a workflow in one service provider system or between service provider systems of selected ones of the service provider systems. Hence, more complex functions than delivering additional data may also be provided by the technical concept disclosed herein.

According to a further permissive embodiment of the method, transactional data of the mentioned workflow may be stored in a central database system, like a relational database system, or in a distributed database, like a blockchain system, for a plurality of service providers, or for only one service provider. This may be advantageous if a plurality of systems is involved in providing the additional data together with a predefined service relating to the data.

According to an additional embodiment, the method may also comprise using a trusted authority for creating user credentials and encryption and decryption keys for the additional data. This way, the provider of the geographical map is not involved in any security relevant data handling apart from the providing the digital geographical data. The encryption/decryption keys may be either asymmetrical (e.g., public/private key, such as Pretty Good Privacy (PGP)) or symmetrical.

In the following, a detailed description of the Figures will be given. All instructions in the Figures are schematic. Firstly, a block diagram of an embodiment of the inventive method for enriching map functions of a digital geographical map is given. Afterwards, further embodiments, as well as embodiments of the system for enriching map functions of a digital geographical map, will be described.

FIG. 1 is a flow diagram illustrating an embodiment of the method 100 for enriching map functions, like the additional data, transactions, workflows, etc., of a digital geographical map. The method 100 comprises storing the additional data in a storage unit outside map data of the digital geographical map and direct related map metadata. This is illustrated at step 102. In some embodiments, templates for workflows, transactions, or similar are stored as well.

The method also comprises correlating elements of the data to coordinates of the geographical map—e.g., by the broker. This is illustrated (at least) at step 104. Further, the method comprises providing access to the additional data via an authentication service while navigating the digital geographical map with a pointing device. This is illustrated at step 106. This may be achieved by an enhanced browser function—e.g., in the form of an enhanced browser component—operated by a user. The browser also displays the map and is in fact the de-facto coordination point of control for accessing the additional data, triggering transactions and workflow actions.

FIG. 2 is a block diagram illustrating an embodiment of functional and system components 200 for implementing the proposed concept. The digital map can be displayed in a browser 202 on a computer display (not shown). The data for the digital geographical map may be provided by a system 204 of a map service provider. The map service provider system 204 can store the map data 208 together with potential metadata 210, or in a non-volatile storage system 206. All users using any browser may be provided the same map data and map metadata relating to the map.

Additionally, there may be a browser enhancement component 212 adapted for handling the additional data not being provided by the map service provider system 204. The browser enhancement component 212 can be integrated into the browser 202, or can be a separate functional module positioned between the browser 202 and a network access component (not shown) of an underlying computing system (not shown).

In a first step, user credentials are agreed to using the browser enhancement component 212, and a system 216 of the trusted entity. This way, it may be ensured that access to the additional data may only be granted to authorized users. The system 216 of the trusted entity can also generate encryption and decryption keys provided to the browser enhancement component 212 and a service provider system 218 (refer to 238). In case no trusted authority is available, the browser enhancement component 212 and the service provider system 218 agree on a pair of encryption/decryption keys ensuring that the broker system 214 has no access.

The broker system 214 is an intermediate system mapping requests of users of the browser 202 navigating through a digital geographical map and a service provider system 218, accessing the additional data 220 on a related storage system.

The broker system 214 has—after the initialization—a directory stored on a non-volatile storage system 232, mapping geographical locations, which are defined by geographical coordinates (e.g., in the Universal Transverse Mercator coordinate system) and user data together with the user credentials and related addresses for at least one service provider system 218.

Next, the process of having access to the additional data 220 inside a map from the map service provider system 204 will be explained. The user marks an area on the displayed map in the browser 202, e.g., by clicking on the pointing device and extending a rectangle from the click point. Corner points of the so marked area will be transferred from the browser 202 to the browser enhancement component 212. Assuming that the user has logged in prior to this process, the user may have made his user credentials available to the browser enhancement component 212.

These data are then transferred to the broker system 214, which verifies the user credentials (refer to 234). This may be assisted by the system 216 of the trusted authority. From its storage system directory 232, the broker system 214 determines if special points of interest to the user are present in the received geographical area. If these points of interest are present, the broker system 214 sends back coordinates of these points of interest via the browser enhancement component 212 to the browser 202 for display. Now, the user can see his individual points of interest in the map provided by the map service provider system 204 without making this data visible to the map service provider. However, up to now the user may not have access to the additional data 220. It should be noted that the broker may access the additional data 220 in encrypted form, but never in clear text.

When the user hovers over such a point of interest, or clicks on a symbol relating to the point of interest in the displayed map in the browser 202, the broker system 214 sends a request to the service provider system 218. In response to the request, the service provider system 218 retrieves the additional data 220 relating to the point of interest, encrypts the data 220 with the received encryption key, and sends the data 220 back in encrypted form via the broker system 214 (refer to 236). The data 220 are displayed in the browser 202 via the browser enhancement component 212. Thus, neither the map service provider with a map service provider system 204 nor the broker system 214 can access the additional data 220 in an unencrypted form. Only the browser enhancement component 212 is able to decrypt the additional data 220 received for displaying it at or near the point of interest in the browser 220. Therefore, sensitive, private, and/or confidential data may be displayed as part of a digital geographical map provided by a map service provider without the knowledge of the map service provider.

Based on the point of interest in the digital map, and potentially based on displayed additional data 228, a workflow—symbolized by arrow 230—may be triggered between different service providers systems 222, 218, 226 and related storage systems/data 224, 220, 228. As an enhancement or in addition to the described workflow, transactions within one service provider system 222, 218, 226, or between the systems may also be triggered. As one option, the workflow and/or the transactions may be managed using blockchain technology. Additionally, it should be noted that one or more of the storage systems 224, 220, 228 may be secure storage systems in which the data are stored in a secure (e.g., encrypted) way. It should also be noted that the additional service provider systems receive an encryption key from the trusted authority.

Thus, the broker system 214 in combination with the system 216 of the trusted authority and the browser enhancement component 212 represents an abstraction layer between the additional data 220 and the browser 202 displaying the digital geographical map.

Furthermore, each of the service provider system have an equivalent to the browser enhancement component 212 of the user system. Such server enhancement components (not shown) may also be browsers with plugins for handling requests transmitted by the broker system 214 or application programming interfaces (APIs) for accessing the data.

FIG. 3 is a block diagram illustrating an exemplary fraction of a digital geographical map 300. This may be used to illustrate a use case of the proposed more abstract concept. In this example, a street 304 crosses a river 306. In the surrounding area, a plurality of buildings and/or estates 302-1-302-10 (collectively 302) is shown in the map 300. One estate 302-4 is shown as reaching into the street 304. The protruding portion 310 of this estate 302-4 is represented by a dashed line. This portion 310 may be a hindrance for a walkway along the street 304. The owner of the estate 302-4 may decide to donate a required portion of his estate 302-4 to the government in order to provide a walkway as broad as the walkways before other estates on the same street 304. This would require a series of transactions. In this example, a bank, a governmental real estate registry, a notary, and/or other functional units may be involved in these transactions.

It may be assumed that the user wanting to donate a part of his estate 302-4, the bank, the governmental real estate registry, and the notary may all use browsers having the browser enhancement component 212 illustrated in FIG. 2. Thus, the involved entities may see the enriched map of the map service provider without the knowledge of the map service provider. The transactions required in donating the protruding part 310 of the estate 302-4 to the government may now be triggered using the browser 202 and the browser enhancement component 212. Thus, one service provider system 222 may be operated by the bank, one service provider system 218 may be operated by the governmental real estate registry, and another service provider system 226 may be operated by the notary. The workflow 230 of donating a portion of the real estate 302-4 to the government may now be performed paperlessly as an enrichment function to the digital geographical map.

It may be clear to a skilled person that the bank, the governmental real estate registry, and the notary have registered with the system 216 of the trusted authority beforehand. However, it may not be required that all of these entities may have registered with the system 214 of the same broker. They may access their specific additional data relating to a specific geographical location (point of interest) using another system 214 of another broker. Doing so, the general concept may still work.

It should also be noted that a token mechanism or similar may be used to link the steps required by the individual service provider systems 222, 218, 226, and to ensure that a previous required step is completed.

In order to give a second, more simple example, the following may be assumed: a user may have equipped his home with IoT (Internet of things) devices. That is, he has equipped his home with a plurality of sensors, such as an alarm system, a temperature control and measurement system, a video surveillance system, etc. All of these sensors may generate data that may be stored as additional data 220 on a server physically located within the home, or on a system of a cloud computing provider. However, the user may—using the proposed concept—access the sensor data as additional data 220 from any place, e.g., by a mobile device while, optionally, being on vacation.

He may call up a digital geographical map from the system 204 of the map service provider. A portion of the map includes the location of his home. After having registered, he may hover with a pointing device over the area of his home in order to access the additional data 220 relating to his private home. Alternatively, he may mark an area on the map which may also include his home. These data may be sent via the browser enhancement component 212 to the system 214 of the broker as a request 234. The system 214 of the broker finds in its directory a relationship between the user credentials and the physical location in the map (identified by the coordinate ranges) and redirects the request to the system 218 to access the additional data 220. This way, a user may have access to all of the data relating to the aforementioned sensors when he is away from his home, and without sharing these data with the map service provider. The system 204 of the map service provider is not even aware of the enrichment functions for the map.

Expanding this example, a real estate service company may be able to maintain and control sensors (e.g., meters) installed in different apartments at different estates. Sensor data may be read out simply by navigating, in the browser 202, to the different locations of the serviced buildings in the map displayed in the browser 202. The described technical flow of request and response via the broker system 214 and the service provider system 218 will easily allow an access to the additional data 220 of sensors—e.g., for heating systems, energy consumption, water consumption, wastewater, elevators, first aid the parking garage, etc.—in the buildings.

FIG. 4 is a simplified block diagram illustrating a system 400 for enriching map functions of a digital geographical map. The system comprises a storage unit 402 for storing additional data other than map data of the digital geographical map and map metadata, a correlation unit 404 adapted for correlating elements of the data to coordinates of the geographical map, and an access unit 406 adapted for providing access to the additional data via an authentication service while navigating the geographical map. Embodiments of the disclosure may be implemented together with virtually any type of computer, regardless of the platform for storing and/or executing program code. An example of this is discussed with respect to FIG. 5.

FIG. 5 is a block diagram illustrating a computer system 500 suitable for executing program code related to the proposed method. Computer system 500 is only one example of a suitable computer system, and is not intended to suggest any limitation as to the scope of use or functionality of embodiments of the disclosure described herein. Computer system 500 includes components that are operational with numerous other general purpose or special purpose computing system environments or configurations. Examples of well-known computing systems, environments, and/or configurations that may be suitable for use with computer system 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments that include any of the above systems or devices, and the like.

Computer system 500 may be described in the general context of computer system-executable instructions, such as program modules, being executed by computer system 500. Generally, program modules may include routines, programs, objects, components, logic, data structures, and so on that perform particular tasks, or implement particular abstract data types. Computer system 500 may be practiced in distributed cloud computing environments where tasks are performed by remote processing devices that are linked through a communications network. In a distributed cloud computing environment, program modules may be located in both local and remote computer system storage media, including memory storage devices.

As shown in the Figure, computer system 500 is shown in the form of a general-purpose computing device. The components of computer system 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. Non-limiting examples of such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system 500 typically includes a variety of computer system readable media. Such media may be any available media that is accessible by computer system 500, such as volatile and non-volatile media, and removable and non-removable media.

The system memory 504 may include computer-readable media in the form of volatile memory, such as random-access memory (RAM) 508 and/or cache memory 510. Computer system 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the disclosure.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data, or some combination thereof, may include an implementation of a networking environment. Program modules 516 generally carry out the functions and/or methodologies of embodiments of the disclosure, as described herein.

The computer system 500 may also communicate with one or more external devices 518 such as a keyboard, a pointing device, a display 520, etc.; one or more devices that enable a user to interact with computer system 500; and/or any devices (e.g., network card, modem, etc.) that enable computer system 500 to communicate with one or more other computing devices. Such communication can occur via input/output (I/O) interfaces 514. Still yet, computer system 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system 500. Examples include, but are not limited to: microcode, device drivers, redundant processing units, external disk drive arrays, RAID systems, tape drives, data archival storage systems, etc.

Additionally, the system 400 for enriching map functions of a digital geographical map may be attached to the bus system 506.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random-access memory (RAM), a read-only memory (ROM), a rigid magnetic disk, and an optical disk. Current examples of optical disks include compact disk-read only memory (CD-ROM), compact disk-read/write (CD-R/W), DVD, and Blu-Ray-Disk.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, e.g., the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages (e.g., an object-oriented programming language such as Smalltalk, C++ or the like, and conventional procedural programming languages, such as the "C" programming language or similar programming languages). The computer readable program instructions may execute entirely on the user's computer, partly on the user's computer as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider). In some embodiments, electronic circuitry (e.g., programmable logic circuitry, field-programmable gate arrays (FPGA), or programmable logic arrays (PLA)) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatuses, or other device to produce a computer implemented process, such that the instructions which execute on the computer, other programmable apparatuses, or other device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only, and is not intended to limit the disclosure. As used herein, the singular forms "a", "an" and "the" are intended to include the plural forms as well, unless the context clearly indicates otherwise. It will further be understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

What is claimed is:

1. A method for enriching map functions of a digital geographical map, the method comprising:
storing additional data in a storage unit of a broker system outside a map service provider system that stores map data of the digital geographical map and direct related map metadata, wherein neither the broker system nor the map service provider system can access the additional data in an unencrypted form;
correlating elements of the additional data to coordinates of the geographical map; and
providing access to the additional data in the unencrypted form via an authentication service while the digital geographical map is navigated.

2. The method according to claim 1, wherein the additional data are selected from a group consisting of confidential data, personal data, and sensitive data.

3. The method according to claim 1, further comprising triggering a transaction when providing access to the additional data.

4. The method according to claim 1, wherein the additional data are encrypted when accessed by the broker system.

5. The method according to claim 1, wherein the providing access to the additional data comprises selecting a provider of the additional data based on received navigation data and related user credentials.

6. The method according to claim 1, wherein the providing access to the additional data comprises:
selecting a geographical area;
sending coordinates framing the geographical area from a requestor site;
determining a relationship between the coordinates and a service provider having stored the additional data relating to the geographical area; and
receiving the additional data in encrypted form at the requestor site.

7. The method according to claim 1, wherein the additional data are provided by a plurality of service provider systems, and wherein the providing access to the additional data comprises triggering a workflow in one service provider system or between selected service provider systems.

8. The method according to claim 7, wherein transactional data of the workflow are stored in a central database system.

9. The method according to claim 1, further comprising using a trusted authority for creating user credentials and encryption and decryption keys for the additional data.

10. A system for enriching map functions of a digital geographical map, the system comprising:
a storage unit of a broker system for storing additional data outside a map service provider system that stores map data of the digital geographical map and map metadata, wherein neither the broker system nor the map service provider system can access the additional data in an unencrypted form;
a correlation unit adapted for correlating elements of the additional data to coordinates of the geographical map; and
an access unit adapted for providing access to the additional data in the unencrypted form via an authentication service while the geographical map is navigated.

11. The system according to claim 10, wherein the additional data are confidential data, personal data, or sensitive data.

12. The system according to claim 10, wherein the access unit is also adapted for providing access to the additional data, and triggering a transaction.

13. The system according to claim 10, wherein the additional data are encrypted when accessed by the broker system.

14. The system according to claim 10, wherein the access unit is also adapted for selecting a provider of the additional data based on received navigation data and related user credentials.

15. The system according to claim 10, further comprising:
a selection unit adapted for selecting a geographical area;
a sending unit adapted for sending coordinates framing the geographical area to the broker system from a requestor site;
a determination module adapted for determining a relationship between the coordinates;
a service provider system having stored the additional data relating to the geographical area; and
a receiving unit adapted for receiving the additional data in encrypted form at the requestor site.

16. The system according to claim 10, wherein the additional data are providable by a plurality of service provider systems, and wherein the access unit is further adapted for triggering a workflow in one service provider system or between selected service provider systems.

17. The system according to claim 16, wherein transactional data of the workflow are storable in a central database system or in a distributed database.

18. The system according to claim 10, further comprising a trusted authority adapted for creating user credentials and encryption and decryption keys for the additional data.

19. A computer program product for enriching map functions of a digital geographical map, said computer program product comprising a computer readable storage medium having program instructions embodied therewith, said program instructions being executable by one or more computing systems to cause said one or more computing systems to perform a method comprising:
storing additional data in a storage unit of a broker system outside a map service provider system that stores map data of the digital geographical map and direct related map metadata, wherein neither the broker system nor the map service provider system can access the additional data in an unencrypted form;
correlating elements of the additional data to coordinates of the digital geographical map; and
providing access to the additional data in the unencrypted form via an authentication service while the digital geographical map is navigated.

* * * * *